(12) United States Patent
Mehandjiysky et al.

(10) Patent No.: US 11,493,952 B2
(45) Date of Patent: Nov. 8, 2022

(54) ELECTRONIC DEVICES WITH A DEPLOYABLE FLEXIBLE DISPLAY

(71) Applicant: Hewlett-Packard Development Company, L.P., Houston, TX (US)

(72) Inventors: Dimitre Mehandjiysky, Houston, TX (US); Kevin L Massaro, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 861 days.

(21) Appl. No.: 16/074,070

(22) PCT Filed: Apr. 28, 2016

(86) PCT No.: PCT/US2016/029693
§ 371 (c)(1),
(2) Date: Jul. 30, 2018

(87) PCT Pub. No.: WO2017/188952
PCT Pub. Date: Nov. 2, 2017

(65) Prior Publication Data
US 2021/0208634 A1   Jul. 8, 2021

(51) Int. Cl.
*G06F 1/16* (2006.01)
*G06F 3/02* (2006.01)
*G06F 3/042* (2006.01)

(52) U.S. Cl.
CPC ............ *G06F 1/16* (2013.01); *G06F 1/1652* (2013.01); *G06F 3/02* (2013.01); *G06F 3/0426* (2013.01); *G09G 2380/02* (2013.01)

(58) Field of Classification Search
CPC ........ G06F 1/16; G06F 1/1601; G06F 1/1605; G06F 1/1652; G06F 1/1686; G06F 3/0426; G06F 3/147; G06F 2200/1631; G09G 3/001; G09G 2354/00; G09G 2380/02; H04N 5/655
See application file for complete search history.

(56) References Cited

U.S. PATENT DOCUMENTS 6,446,696 B1    9/2002  Davies et al.
6,913,332 B1    7/2005  Besterfield et al.
(Continued)

FOREIGN PATENT DOCUMENTS

CN     1926595      3/2007
CN     201185067    1/2009
(Continued)

OTHER PUBLICATIONS

Ragaza ~ "The 10 Best All-in-one PCs" ~ http://in.pcmag.com/desktop ~ Jan. 26, 2015 ~ 7 pages.

*Primary Examiner* — Nelson M Rosario
(74) *Attorney, Agent, or Firm* — HP Inc. Patent Department

(57) ABSTRACT

Examples disclosed herein provide electronic devices with a flexible display. An example electronic device includes an enclosure, a flexible display deployable from the enclosure, where a viewing angle of the flexible display with respect to the enclosure is adjustable. The electronic device includes a mechanism to autonomously deploy and retract the flexible display within the enclosure, and a supporting structure to reinforce the flexible display when deployed from the enclosure.

13 Claims, 9 Drawing Sheets

(56) References Cited

U.S. PATENT DOCUMENTS

| | | | |
|---|---|---|---|
| 9,307,658 B2 * | 4/2016 | Song | G09F 9/301 |
| 9,844,152 B2 * | 12/2017 | Heo | G09F 9/301 |
| 10,241,542 B2 * | 3/2019 | Kwak | G09F 9/301 |
| 2003/0050019 A1 | 3/2003 | Dowling et al. | |
| 2007/0153461 A1 * | 7/2007 | Singh | G06F 1/1635 |
| | | | 361/679.11 |
| 2009/0233265 A1 | 9/2009 | Budryk | |
| 2010/0182738 A1 | 7/2010 | Visser et al. | |
| 2010/0214730 A1 | 8/2010 | Tizler et al. | |
| 2011/0267316 A1 | 11/2011 | Kim et al. | |
| 2012/0204453 A1 | 8/2012 | Jung | |
| 2013/0271940 A1 | 10/2013 | Cope et al. | |
| 2014/0224953 A1 | 8/2014 | Ijano et al. | |
| 2014/0268532 A1 * | 9/2014 | Nicol | G09F 9/301 |
| | | | 361/679.26 |
| 2015/0029229 A1 | 1/2015 | Voutsas | |
| 2015/0340004 A1 | 11/2015 | Pang | |
| 2016/0112667 A1 * | 4/2016 | Park | G06F 1/1652 |
| | | | 348/739 |
| 2016/0224067 A1 * | 8/2016 | Meng | G06F 1/203 |
| 2017/0075433 A1 * | 3/2017 | Hou | G06F 3/038 |

FOREIGN PATENT DOCUMENTS

| | | |
|---|---|---|
| CN | 105096743 | 11/2015 |
| CN | 102984893 | 1/2016 |
| EP | 1713047 | 10/2006 |
| EP | 1710665 | 11/2006 |
| EP | 2881840 A2 | 6/2015 |
| EP | 2947643 | 11/2015 |
| WO | WO-2013036245 | 3/2013 |
| WO | 2015/147797 A1 | 10/2015 |

\* cited by examiner

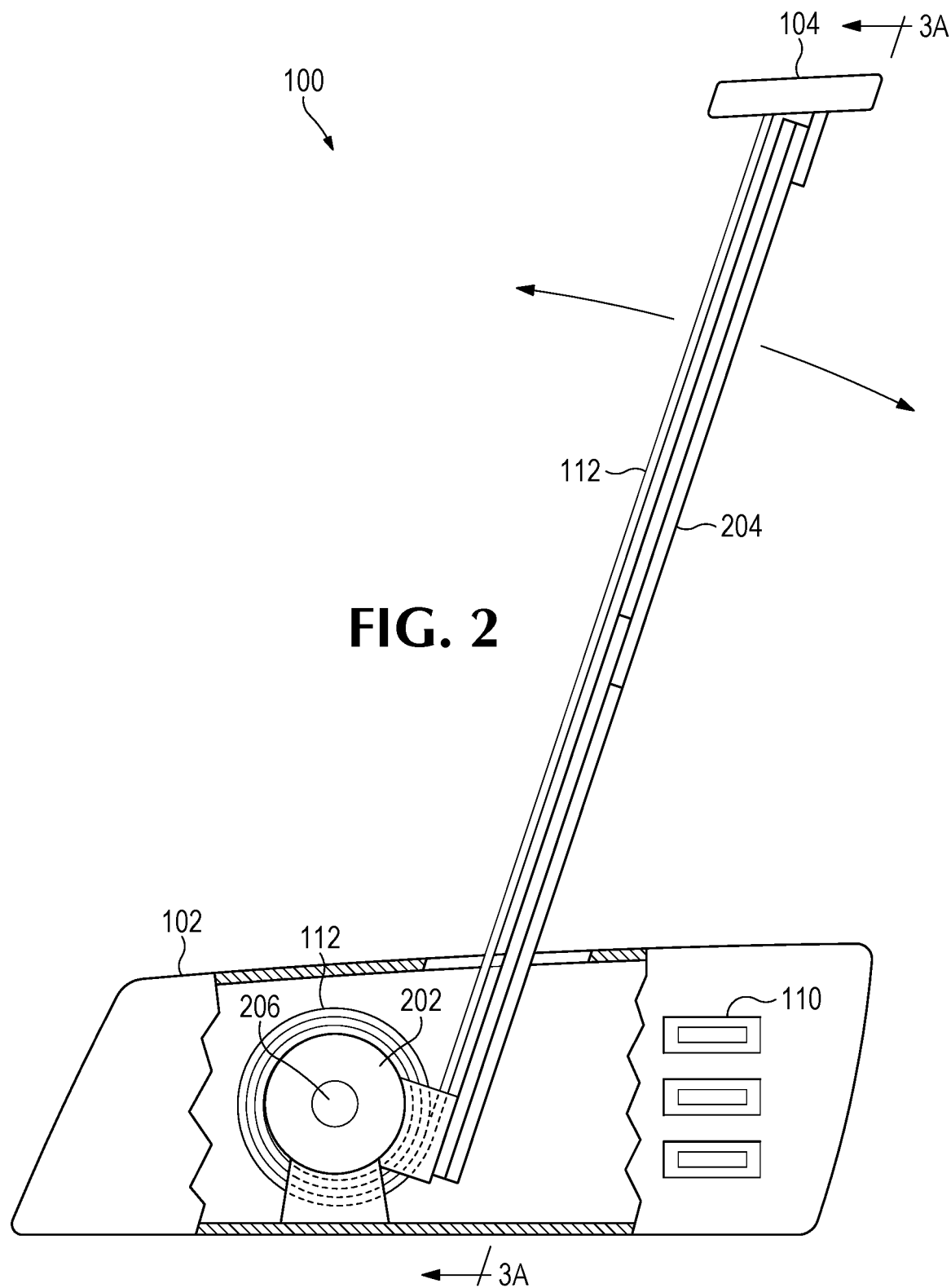

ELECTRONIC DEVICES WITH A DEPLOYABLE FLEXIBLE DISPLAY

BACKGROUND

Electronic visual displays correspond to display devices for presentation of images, text, or video transmitted electronically. Examples of such display devices include, but are not limited to, television sets, computer monitors, digital signage, and applications in mobile computing, like tablet computers, notebook computers, and smartphones.

BRIEF DESCRIPTION OF THE DRAWINGS

FIG. 2 illustrates the internal mechanism of the electronic device for deploying and retracting the flexible display within an enclosure, according to an example;

DETAILED DESCRIPTION

Technologies corresponding to electronic visual displays continue to evolve. For example, flat panel displays are lighter and thinner than prior generation video displays (e.g., displays using cathode ray tubes). Also, any display disadvantages for flat panel displays may be made up for by advantages regarding portability. However, electronic visual displays, such as those utilizing flat panel display technology, may take up more space than is desirable.

Examples disclosed herein provide electronic devices with a deployable flexible display, which corresponds to an electronic visual display that is flexible in nature. With the ability to deploy or retract the flexible display, the electronic device may occupy only a small footprint, which may be advantageous, particularly when space may be limited. In addition, with the ability to retract the flexible display within the electronic device, the electronic device provides for further portability, and the flexible display is protected from the elements (e.g., dust) and when the electronic display is moved.

Figure 1A:
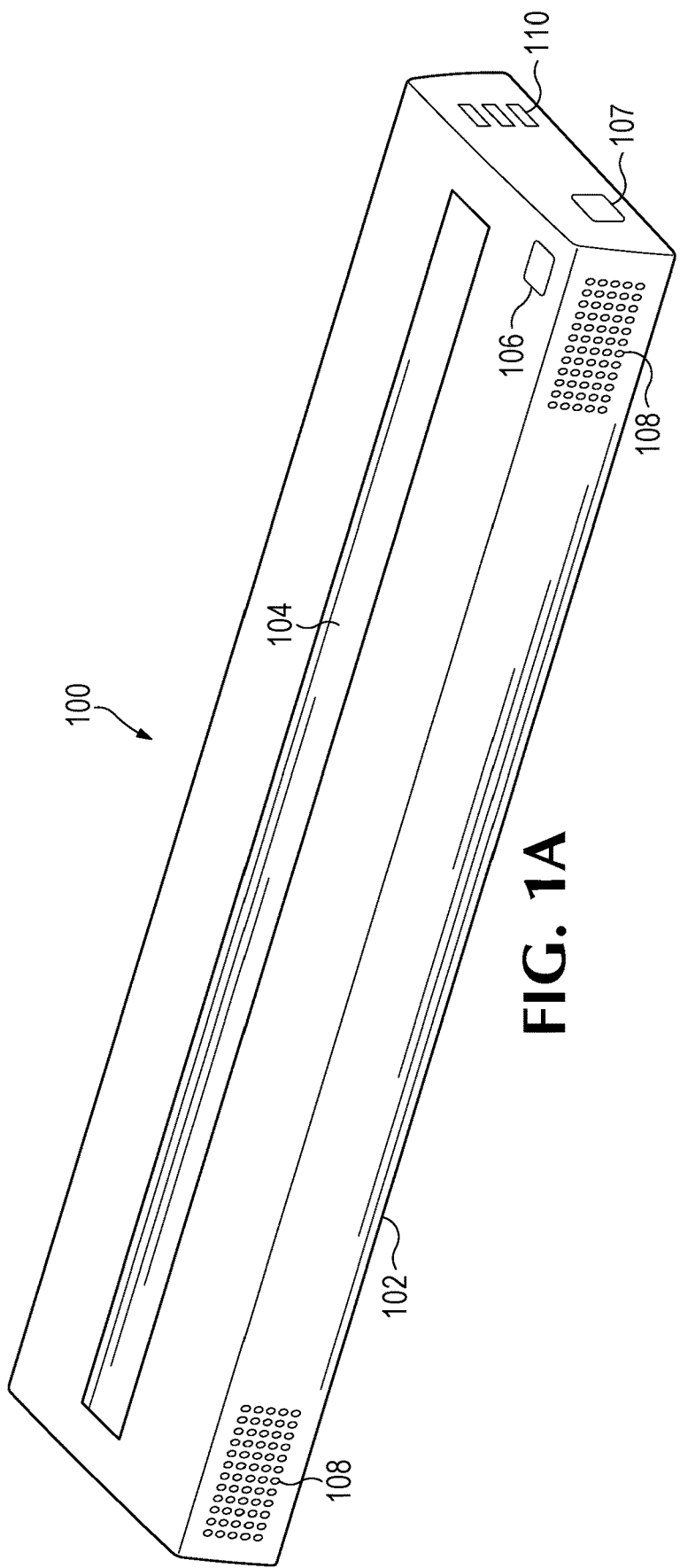
FIGS. 1A-B illustrate an electronic device with a deployable flexible display, according to an example.
Figure 1B:
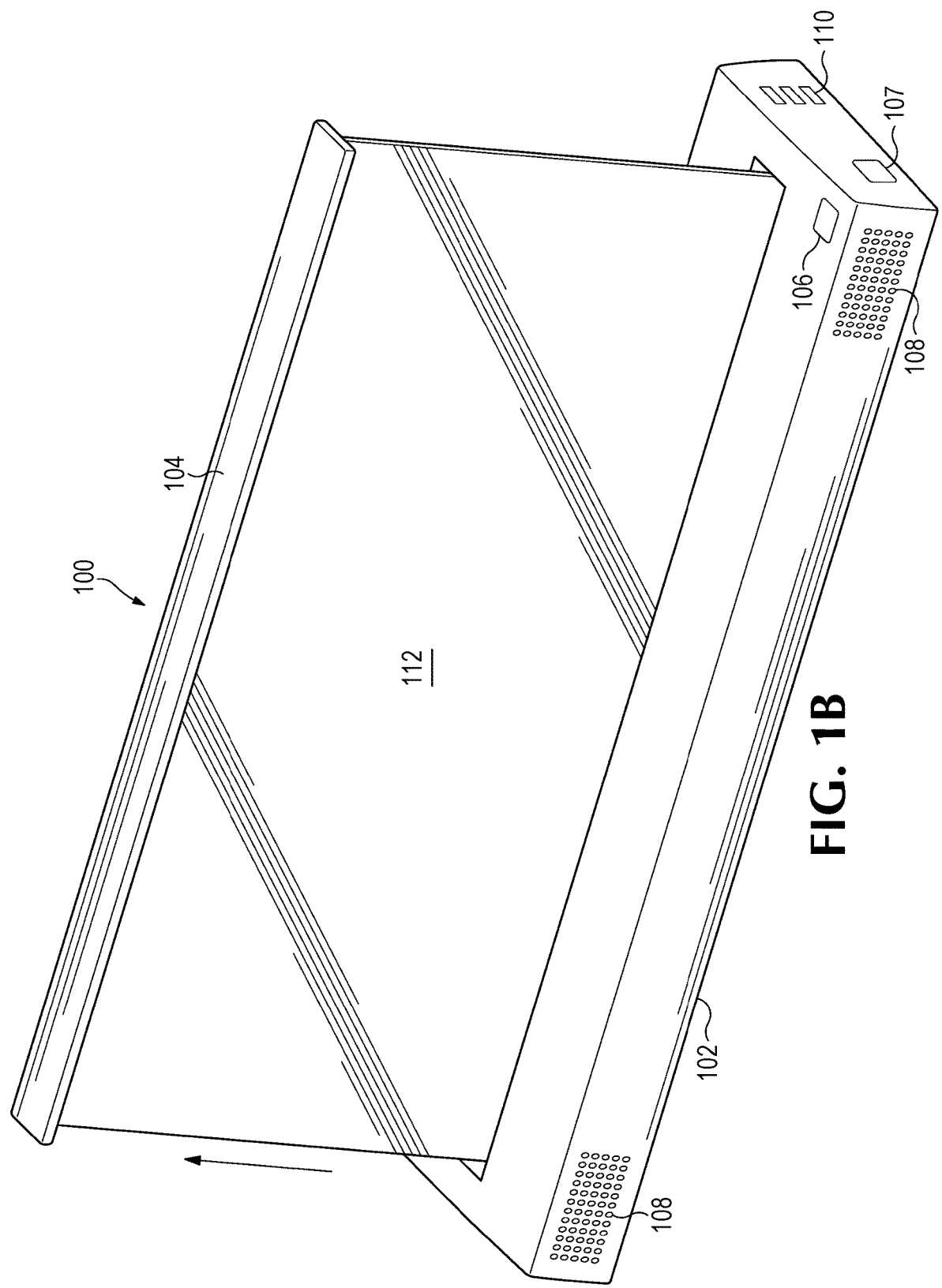

With reference to the figures, FIGS. 1A-B illustrate an electronic device 100 with a deployable flexible display 112, according to an example. As illustrated, the flexible display 112 is deployable from an enclosure 102 of the electronic device 100 (see arrow in FIG. 1B). Similarly, the flexible display 112 may be retracted within the enclosure 102 as well, for example, after use. As an example, multiple aspect ratios may be made available from the single flexible display 112, depending on how far the flexible display 112 is deployed above the enclosure 102. Examples of various aspect ratios include ones for productivity (e.g., 16:10 or 3:2) or for multimedia/entertainment (e.g., 16:9 or 21:9).

As will be further described, the flexible display 112 may be wound on a spool as t is retracted within the enclosure 102 (e.g., see FIG. 2). As a result, the electronic device 100 may occupy only a small footprint, as described above. As an example, the flexible display 112 may be topped off by a panel 104, in order to couple the flexible display 112 to a supporting structure that reinforces the flexible display 112 when deployed from the enclosure 102. In addition, the panel 104 may protect the flexible display 112, for example, from dust, when it is stowed away inside the enclosure 102, as illustrated in FIG. 1A As an example, the form factor for such electronic devices 100 may be applicable across various types electronic devices, such as a standalone all-in-one (AiO) computer, or for a monitor that can work with any computer. Examples of other electronic devices that can incorporate the form factor illustrated include, but are not limited to, television sets and digital signage. As an example, the electronic device 100 can include speakers 106 and various ports 110, chosen according to the type of electronic device (e.g., USB, HDMI, or VGA). The placement of the speakers 108 and the various ports 110 may vary from what is illustrated.

As an example, the deployment and retraction of the flexible display 112 may be autonomous. As will be further described, the electronic device 100 may include a mechanism (e.g., a motorized internal mechanism) to autonomously deploy and retract the flexible display 112 within the enclosure 102 (e.g., see FIG. 2). Referring to the figures, the electronic device 100 may include a button 106 to initiate the autonomous deployment and retraction of the flexible display 112 via the mechanism. However, the autonomous deployment and retraction may be initiated via other methods as well (e.g., software-initiated). Separate buttons 107 may be provided as well, such as a power button. The location of the buttons 106, 107 on the electronic device 100 may vary. In addition, a single button (e.g., button 106) may correspond to the power button and the deploy/retract button.

FIG. 2 illustrates the internal mechanism of the electronic device 100 for deploying and retracting the flexible display 112 within the enclosure 102, according to an example. The internal mechanism generally includes a motor 202, which provides for the autonomous deployment and retraction of the flexible display, for example, when button 106 is pressed. In addition, the internal mechanism may include a spool 206, wherein the flexible display 112 is to wind and unwind from the spool 206 when the flexible display is retracted and deployed, respectively. The internal mechanism, driven by the motor 202, may control the movement and speed of deployment (and retraction) of the flexible display 112, ensuring a smooth and satisfactory user experience. In addition, the motor 202 may deploy the flexible display 112 to the aspect ratio selected by the user, as described above. The placement and the number of motors may vary from what is illustrated, in order to provide for a smooth deployment of the flexible display 112. In addition, other mechanical devices may be used instead of the motor 202 to provide for the deployment and retraction of the flexible display 112 (e.g., electromagnetic devices).

As an example, a viewing angle of the flexible display 112 with respect to the enclosure 102 may be adjustable, as indicated by the arrow. The axis of rotation for providing such adjustability may coincide with the spool 206. As an example, a torqued hinge may be provided to allow for a satisfactory user experience when the viewing angle of the flexible display 112 is adjusted, in order for the flexible display 112 to remain at the viewing angle set by the user.

In order to reinforce the flexible display 112 when deployed from the enclosure 102, a supporting structure 204 may be provided. As an example, the supporting structure 204 may ensure a stability and firmness that is preferred for touchscreen ergonomics. This may be particularly useful when the flexible display 112 is a touchscreen, and the supporting structure 204, as a result, may provide a satisfactory user experience, without the flexible display 112 feeling wobbly when it is touched by a user. As will be further described, the supporting structure 204 may correspond to a scissorlike structure that expands and compresses within the enclosure 102 when the flexible display 112 deploys and retracts, respectively (e.g., see FIGS. 3A-B). However, the supporting structure may correspond to other structures that provide stability and firmness to the flexible display 112 while it is in use.

As an example, the panel 104 may couple the flexible display 112 to the supporting structure 204. As a result, the flexible display 112 and the supporting structure 204 may deploy and retract simultaneously within the enclosure 102. When flexible display 112 and the supporting structure 204 is retracted within the enclosure, they are separated, in order to properly stow away the flexible display 112 and the supporting structure 204. For example, the flexible display 112 winds onto the spool 206, and the supporting structure 204 compresses to fit within the enclosure 102.

Figure 3A:
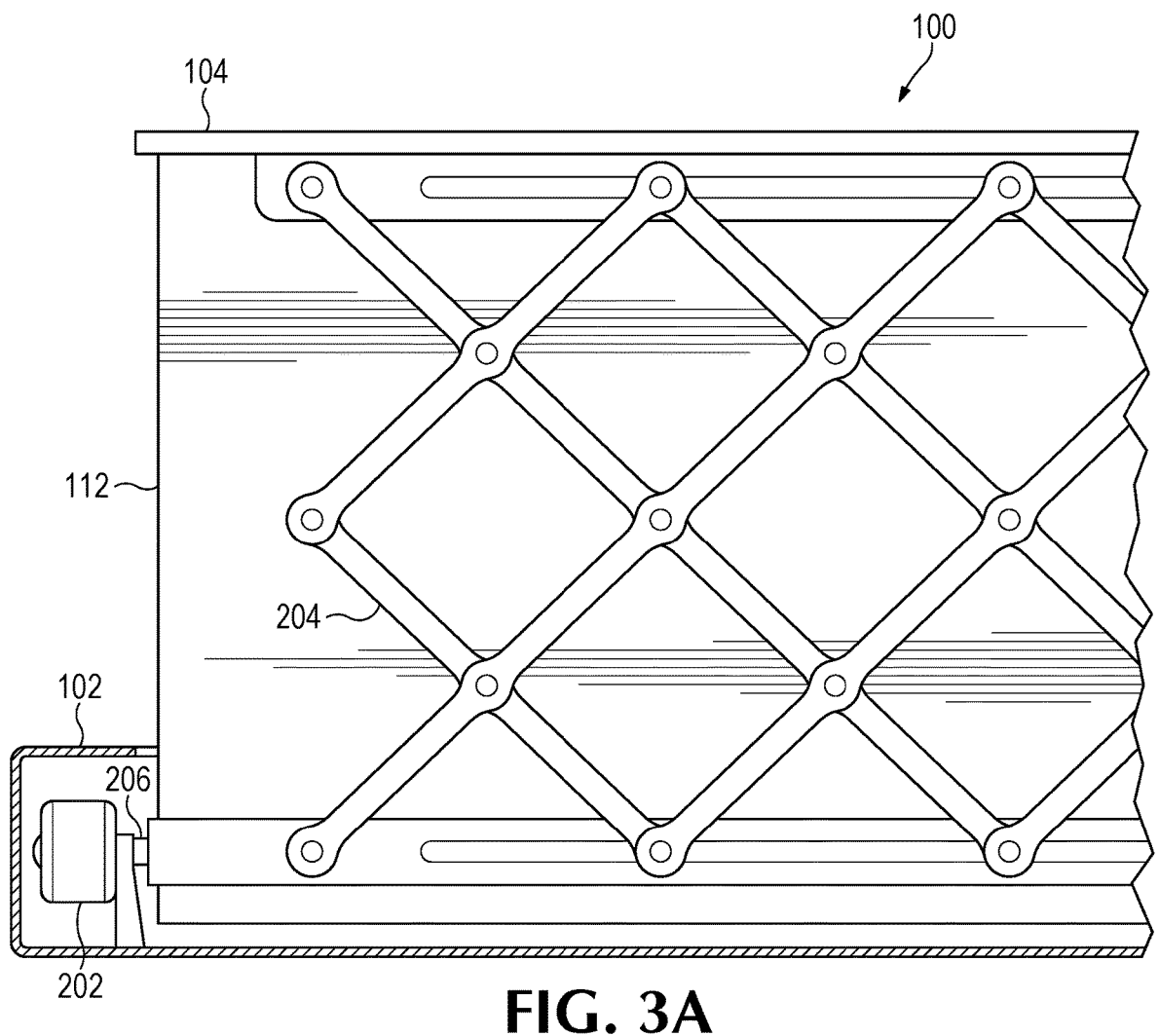
FIGS. 3A-B illustrate a supporting structure of the flexible display as a scissorlike structure, according to an example.
Figure 3B:
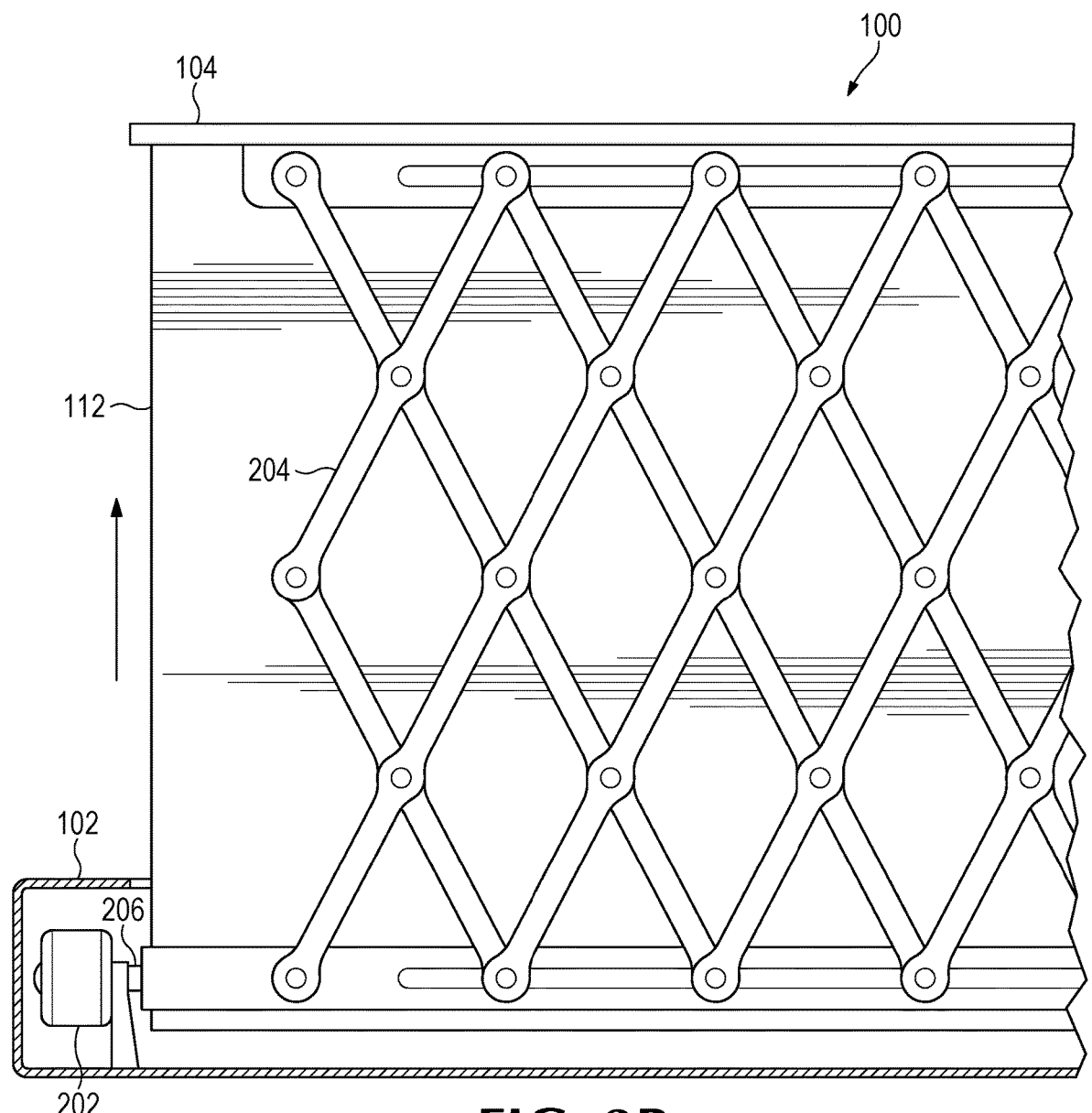

FIGS. 3A-B illustrate the supporting structure 204 as a scissorlike structure, according to an example. With a scissorlike structure, the supporting structure 204 has crossing parts or a motion involving crossing of parts, as illustrated between the figures. With a motion involving the crossing of parts, the supporting structure 204 expands when the flexible display 112 deploys, in order to provide reinforcement to the flexible display 112 (e.g., see FIG. 3B). Similarly, the supporting structure 204 compresses when the flexible display 112 retracts within the enclosure 102. With a motion involving the crossing of parts, the supporting structure 204 can also fully compress in order to fit within the enclosure 102.

As FIGS. 3A-B provide only a cross section of the electronic device 100, the configuration of the supporting structure 204 may vary. For example, multiple, separate supporting structures 204 may be provided along the length of the electronic device 100 (e.g., see FIGS. 4A-B). Similarly, the length of the parts of the supporting structure 204 may vary as well. For example, the parts of the supporting structure 204 may be smaller than what is illustrated in FIGS. 3A-B, leading to a more mesh arrangement for the supporting structure 204.

Figure 4A:
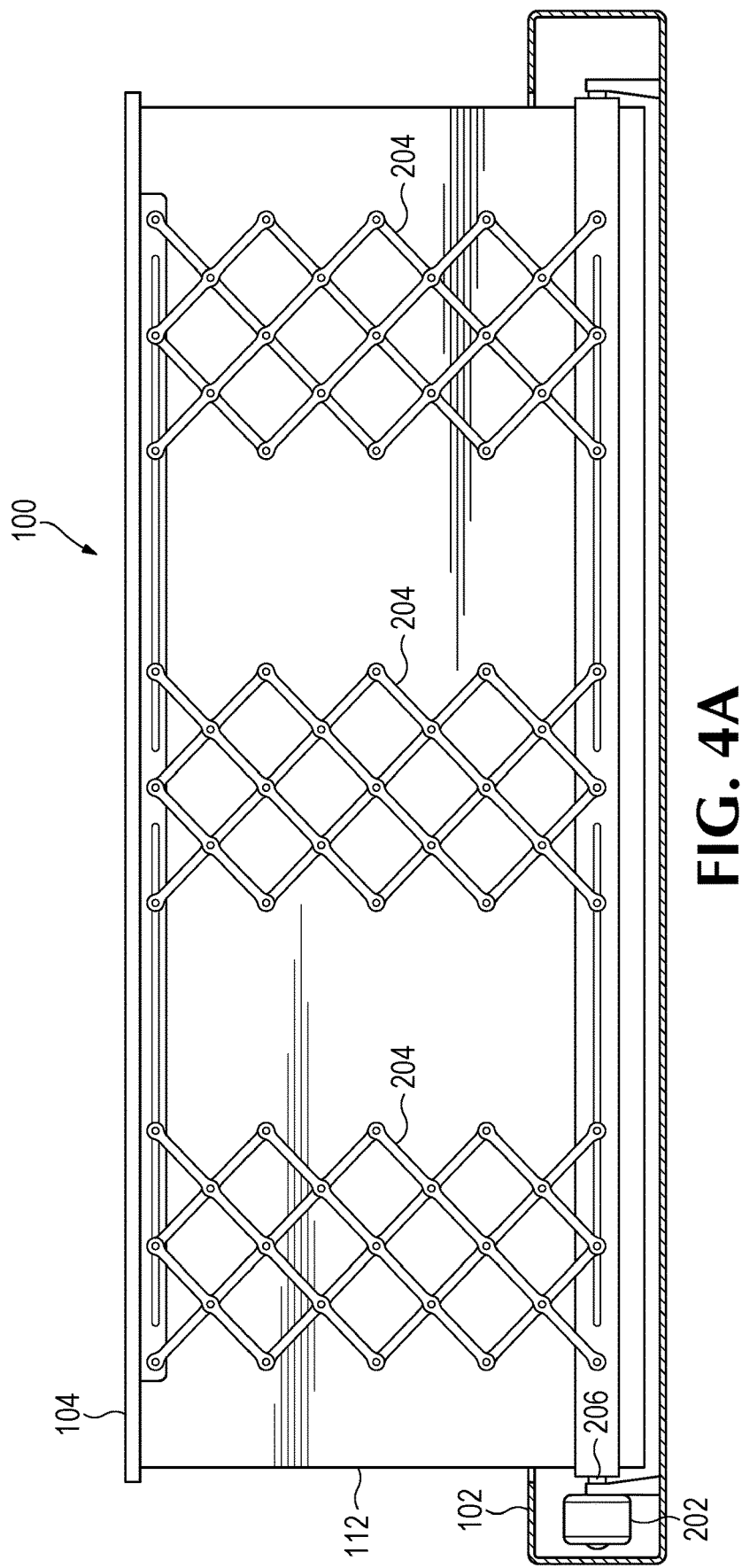
FIGS. 4A-B illustrate multiple supporting structures across a length of the electronic device, according to an example.
Figure 4B:
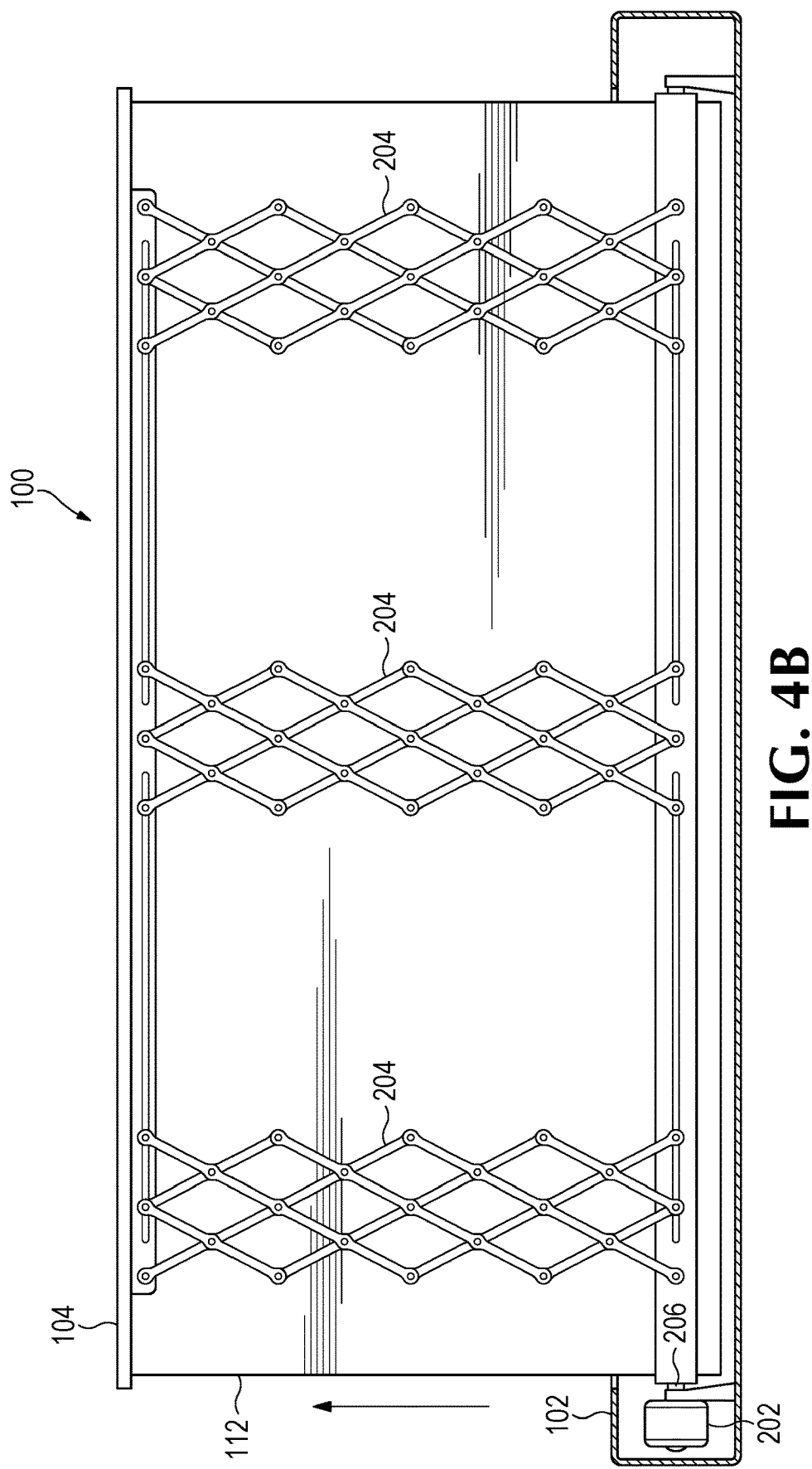

FIGS. 4A-B illustrate multiple supporting structures 204 across a length of the electronic device 100, according to an example. As mentioned above, multiple, separate supporting structures 204 may be provided along the length of the electronic device 100 in order to, as an example, provide a greater level of support for the flexible display 112. However, the separate supporting structures 204 may require sufficient clearance between each other, in order to avoid the separate supporting structures 204 from overlapping when they are compressed to fit within the enclosure 102. As a result, when the flexible display 112, along with the supporting structures 204, are deployed from the enclosure 102, the distance between the separate supporting structures 204 may increase as they are expanded to cover the full length of the flexible display 112.

Figure 5:
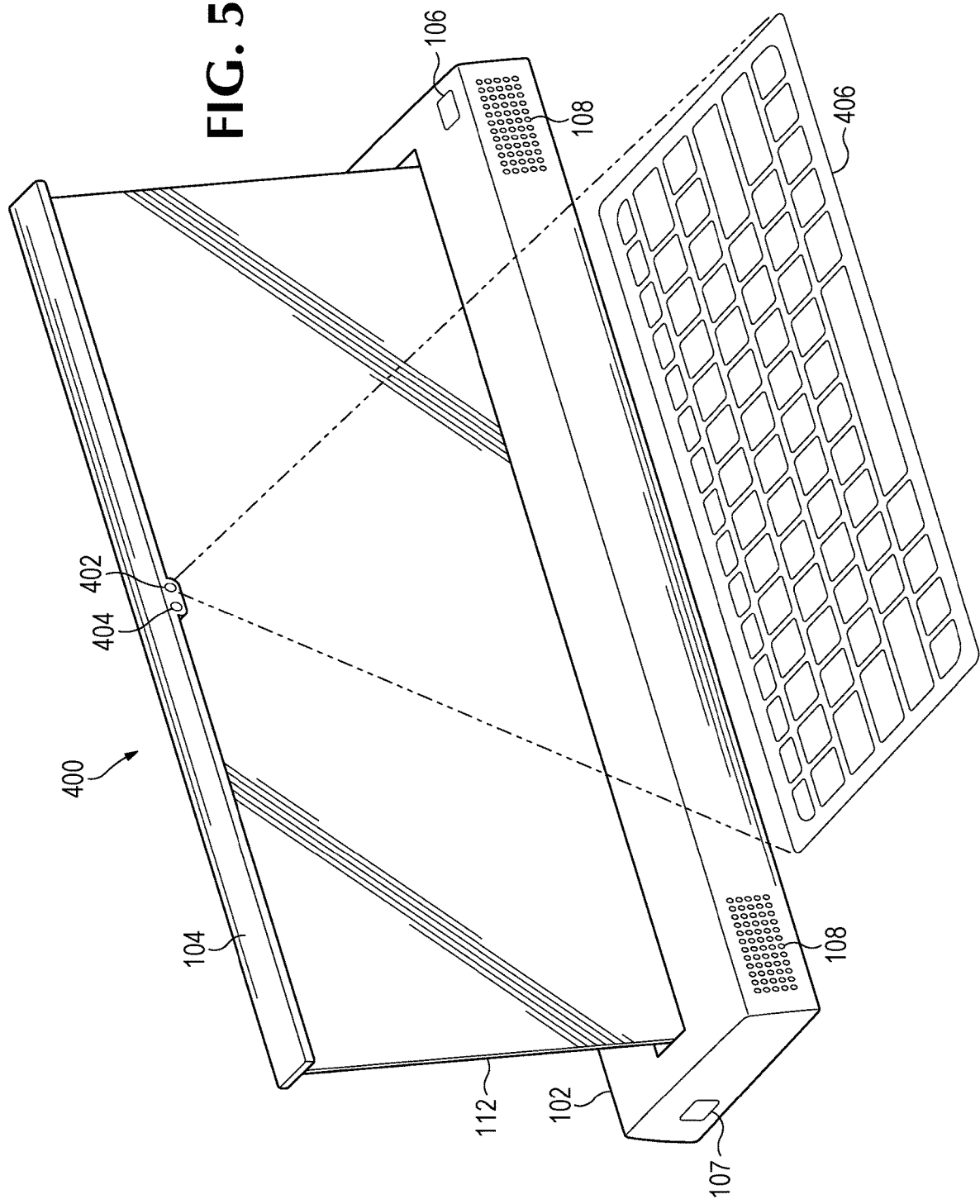
FIG. 5 illustrates an electronic device with a deployable flexible display, according to an example.

FIG. 5 illustrates an electronic device 400, such as an AiO computer, with a deployable flexible display, according to an example. As described above, the form factor for electronic devices with a deployable flexible display may be applicable across various types of electronic devices. As an electronic device, various peripherals, such as a keyboard and mouse, can be connected to the AiO computer 400, wired or wirelessly. As an example, rather than having physical peripherals, the AiO computer 400 can include a projector 402 to project virtual peripherals, such as a virtual keyboard 406. A camera 404 may collect input entered on the keyboard 406 for interacting with the AiO computer 400.

Figure 6:
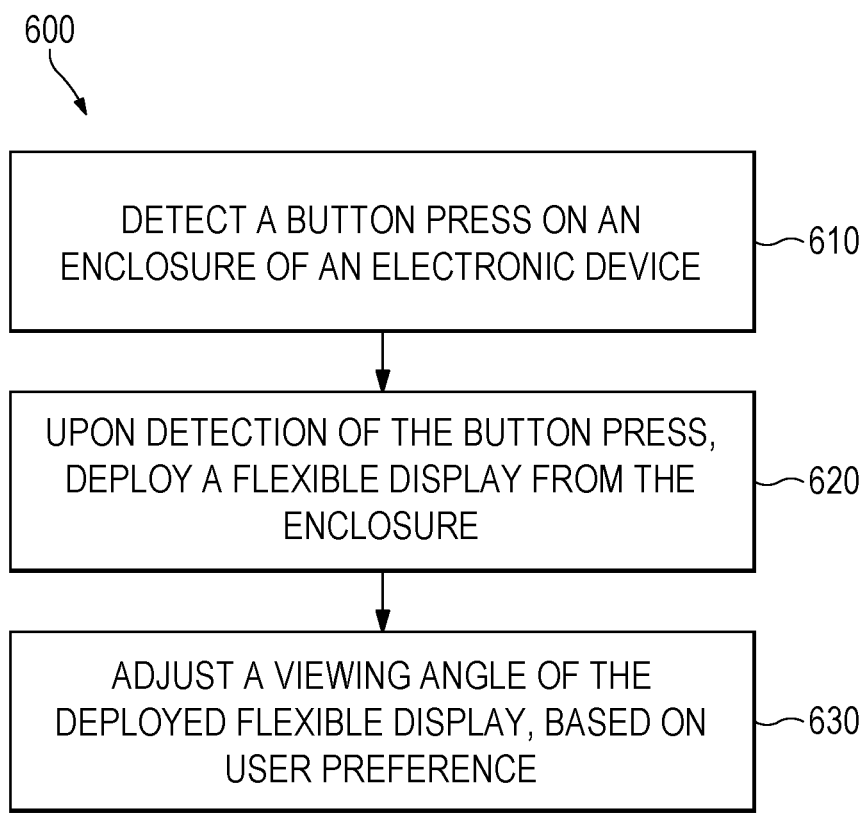
FIG. 6 illustrates a method of operation at an electronic device to deploy a flexible display, according to an example.

FIG. 6 is a flow diagram 600 of steps taken to implement a method for deploying a flexible display from an electronic device, according to an example. In discussing FIG. 6 reference may be made to the example electronic device 100 illustrated in the prior figures. Such reference is made to provide contextual examples and not to limit the manner in which the method depicted by FIG. 6 may be implemented.

At 610, the electronic device monitors for a button press on an enclosure of an electronic device. Referring to electronic device 100, the electronic device 100 may monitor for when button 106 is pressed in order to deploy or retract the flexible display 112.

At 620, upon detection of the button press, the electronic device deploys the flexible display from the enclosure. Referring to electronic device 100, upon detecting button 106 is pressed, the internal mechanism of the electronic device 100, including the motor 202, may autonomously deploy the flexible display 112 to an aspect ratio selected by the user. As an example, selection of the aspect ratio may be via a software implementation, or via multiples presses of the button 106 until the desired aspect ratio is provided. As an example, the electronic device 100 may retract the flexible display 112 within the enclosure 102 upon detecting a subsequent button press (e.g., button 106) or a user-initiated instruction to retract the flexible display 112.

At 630, the electronic device may adjust a viewing angle of the deployed flexible display, based on user preference. As an example, such adjust of the viewing angle may be automated or manually set by the user. For example, a button on the electronic device may be provided to adjust the viewing angle of the flexible display, for example, via a motorized internal mechanism of the electronic device.

Although the flow diagram of FIG. 6 shows a specific order of execution, the order of execution may differ from that which is depicted. For example, the order of execution of two or more blocks or arrows may be scrambled relative to the order shown. Also, two or more blocks shown in succession may be executed concurrently or with partial concurrence. All such variations are within the scope of the present invention.

It is appreciated that examples described herein below may include various components and features. It is also appreciated that, in the following description, numerous specific details are set forth to provide a thorough understanding of the examples. However, it is appreciated that the examples may be practiced without limitations to these specific details. In other instances, well known methods and structures may not be described in detail to avoid unnecessarily obscuring the description of the examples. Also, the examples may be used in combination with each other.

Reference in the specification to "an example" or similar language means that a particular feature, structure, or characteristic described in connection with the example is included in at least one example, but not necessarily in other examples. The various instances of the phrase "in one example" or similar phrases in various places in the specification are not necessarily all referring to the same example.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. An electronic device comprising:
   an enclosure;
   a flexible display deployable from the enclosure, wherein a viewing angle of the flexible display with respect to the enclosure is adjustable;
   a mechanism to autonomously deploy and retract the flexible display within the enclosure, wherein the mechanism comprises a spool, wherein the flexible display is wound on the spool when the mechanism is to retract the flexible display within the enclosure;
   a supporting structure to reinforce the flexible display when deployed from the enclosure; and
   a torqued hinge to maintain the viewing angle of the flexible display when the flexible display is deployed and allow rotation of the flexible display with respect to the enclosure to adjust the viewing angle of the flexible display with respect to the enclosure when the flexible display is deployed;
   wherein the flexible display is rotatable about an axis of rotation to adjust the viewing angle, and wherein the axis of rotation coincides with the spool.

2. The electronic device of claim 1, further comprising a button to initiate the autonomous deployment and retraction of the flexible display.

3. The electronic device of claim 1, wherein the mechanism is to deploy the flexible display to an aspect ratio selectable by a user.

4. The electronic device of claim 1, further comprising:
   a projector to project a virtual keyboard; and
   a camera to collect input entered on the virtual keyboard to interact with the electronic device.

5. The electronic device of claim 1, further comprising:
   a panel to couple the flexible display to the supporting structure, wherein the flexible display and the supporting structure are to deploy and retract simultaneously within the enclosure.

6. The electronic device of claim 1, wherein the supporting structure comprises a scissorlike structure that expands and compresses when the flexible display deploys and retracts, respectively.

7. A method comprising:
   detecting a button press on an enclosure of an electronic device;
   upon detection of the button press, deploying a flexible display from the enclosure, by rotating a spool about which the flexible display is wound; and
   adjusting a viewing angle of the deployed flexible display with a torqued hinge, based on a user preference, by rotation of the flexible display about an axis of rotation that coincides with the spool, wherein the torqued hinge maintains the viewing angle of the flexible display when the flexible display is deployed and allows rotation of the flexible display with respect to the enclosure to adjust the viewing angle of the flexible display with respect to the enclosure when the flexible display is deployed.

8. The method of claim 7, wherein deploying the flexible display comprises deploying the flexible display to an aspect ratio selectable by a user.

9. The method of claim 7, comprising retracting the flexible display within the enclosure upon detecting a subsequent button press or user-initiated instruction to retract the flexible display.

10. The method of claim 7, comprising:
    upon deploying the flexible display, projecting a virtual keyboard for interacting with the electronic device; and
    collecting input entered on the virtual keyboard.

11. An electronic device comprising:
    an enclosure;
    a flexible display deployable from the enclosure, wherein a viewing angle of the flexible display with respect to the enclosure is adjustable;
    a mechanism to autonomously deploy and retract the flexible display within the enclosure, wherein the mechanism comprises a spool, wherein the flexible display is wound on the spool when the mechanism is to retract the flexible display within the enclosure;
    a supporting structure to reinforce the flexible display when deployed from the enclosure;
    a projector to project a peripheral to interact with the electronic device;
    a camera to collect input entered on the peripheral; and
    a torqued hinge to maintain the viewing angle of the flexible display when the flexible display is deployed and allow rotation of the flexible display with respect to the enclosure to adjust the viewing angle of the flexible display with respect to the enclosure when the flexible display is deployed;
    wherein the flexible display is rotatable about an axis of rotation to adjust the viewing angle, and wherein the axis of rotation coincides with the spool.

12. The electronic device of claim 11, further comprising a button to initiate the autonomous deployment and retraction of the flexible display.

13. The electronic device of claim 11, wherein the supporting structure comprises a scissorlike structure that expands and compresses when the flexible display deploys and retracts, respectively.

* * * * *